United States Patent [19]

Kostecki

[11] 3,931,567
[45] Jan. 6, 1976

[54] DC POWER SUPPLY WITH LOAD CURRENT REGULATION

[75] Inventor: Raymond T. Kostecki, Glenview, Ill.

[73] Assignee: Warwick Electronics Inc., Chicago, Ill.

[22] Filed: Feb. 8, 1974

[21] Appl. No.: 440,690

[52] U.S. Cl. .............. 323/9; 178/DIG. 11; 321/14; 323/17; 323/DIG. 1
[51] Int. Cl.² ......................................... G05F 1/58
[58] Field of Search....... 178/7.3 R, DIG. 11; 321/2, 321/14; 323/9, 17, 20, 22 T, DIG. 1

[56] References Cited
UNITED STATES PATENTS

| | | | |
|---|---|---|---|
| 3,473,049 | 10/1969 | Alexander | 323/DIG. 1 |
| 3,739,274 | 6/1973 | DePuy | 321/14 UX |
| 3,745,444 | 7/1973 | Calkin et al. | 323/DIG. 1 |
| 3,781,653 | 12/1973 | Marini | 323/DIG. 1 |
| 3,818,306 | 6/1974 | Marini | 323/DIG. 1 |
| 3,818,318 | 6/1974 | Schott et al. | 323/DIG. 1 |
| 3,819,986 | 6/1974 | Fukuoka | 323/DIG. 1 |

*Primary Examiner*—A. D. Pellinen
*Attorney, Agent, or Firm*—Wegner, Stellman, McCord, Wiles & Wood

[57] ABSTRACT

In a DC power supply, a switching transistor and an inductor are connected in series between an unregulated DC supply and a DC output terminal. The output DC voltage is a function of the on to off ratio of the switching transistor. The switching period of the switching transistor is controlled by a load feedback circuit which compares the output voltage, as sensed by the voltage drop of the current through the switching transistor, with a sawtooth voltage from a synchronized oscillator. An overload detection circuit includes a diode and integrator coupled to a junction between the inductor and the switching transistor. When the switching transistor is turned off, the load current which was flowing through the switching transistor is diverted to the diode. The current through the diode is thus directly proportional to the load current. The load current is detected and causes disabling of the load feedback circuit when the load current rises above a predetermined level.

6 Claims, 10 Drawing Figures

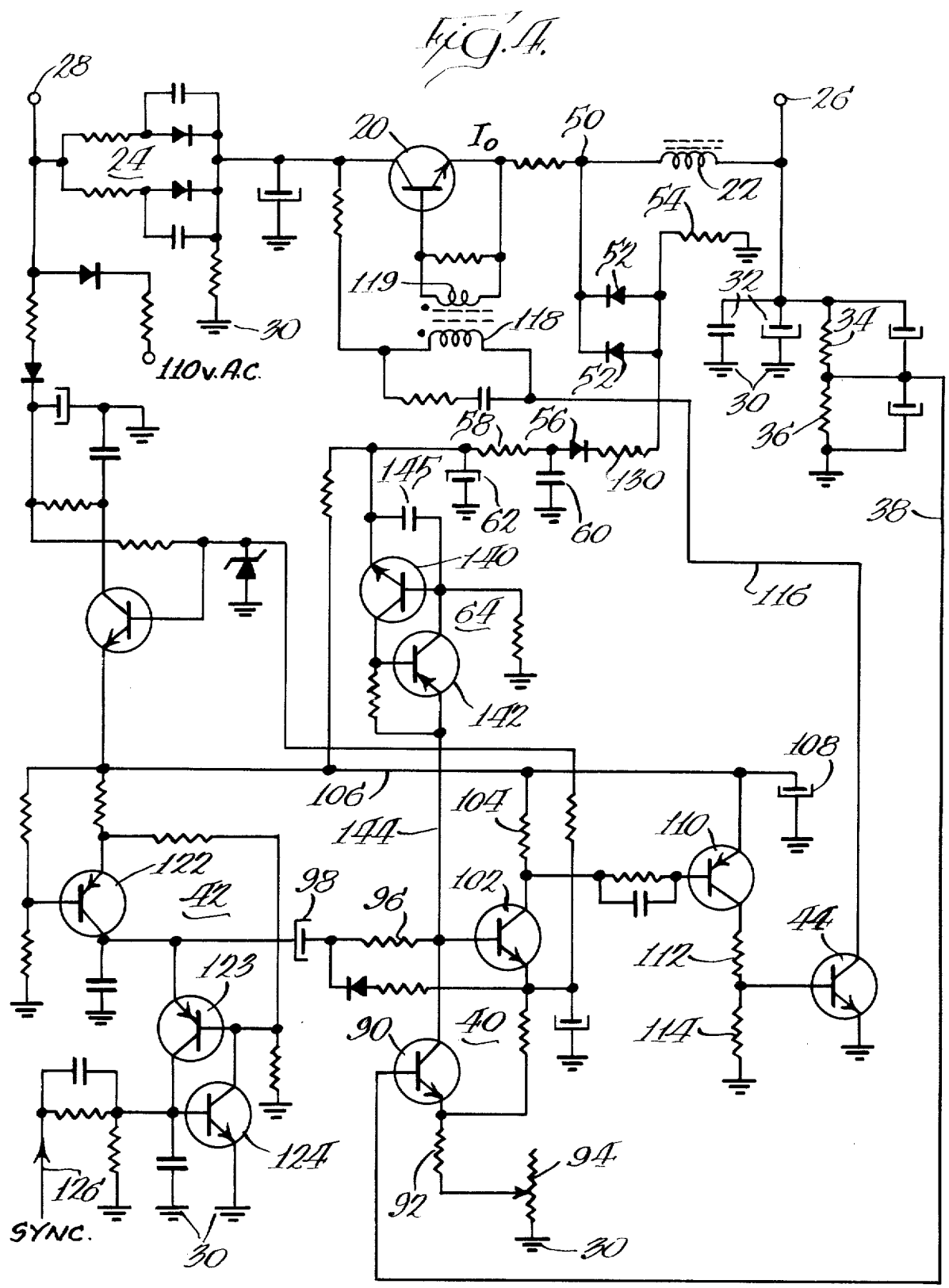

DC POWER SUPPLY WITH LOAD CURRENT REGULATION

BACKGROUND OF THE INVENTION

This invention relates to a DC power supply having feedback circuits for load voltage regulation and overload protection.

DC power supplies are known which use a switching transistor to pass current pulses to a filter network such as a series choke inductor for smoothing the gated current pulses. A feedback network controls the switching period of the transistor to maintain a high degree of voltage regulation and low output ripple. It has been known to protect the switching transistor from high voltage pulses created by the choke inductor by use of a blocking diode, such as shown by U.S. Pat. No. 3,068,392 to Santelmann, Jr. It is also known to use the high voltage pulses created by the choke inductor to control regulation by causing the transistor to conduct in a manner which follows a reference voltage, as shown in U.S. Pat. No. 3,246,229 to Lloyd.

In power supplies using a choke inductor and a switching device, it would be desirable to provide a simplified overload protection circuit which is responsive to the actual load current. Such a device should desirably require a minimum number of components, and should not be placed in series with the switching device. Furthermore, it would be preferable to have a common ground between the unregulated supply and the regulated output. It also would be desirable to provide improved regulation of the switching device in accordance with the sensed load current.

SUMMARY OF THE INVENTION

In accordance with the present invention, a DC power supply includes improved load current sensing for overload protection. The DC power supply is of the type using a switching semiconductor device for passing a switched waveform to a choke inductor which smooths the output current. The DC output voltage is a function of the on to off ratio of the switching device. The current through the switching device is also a function of the output voltage. The current through the choke inductor, when the switching device is turned off, is sensed by an overload protection circuit and disables the switching device when the magnitude of output current exceeds a predetermined current output level. A feedback circuit is responsive to the sensed DC output voltage and a reference level developed by a synchronized sawtooth oscillator, for controlling the period of the switching device. The arrangement allows a common ground between the unregulated supply and the DC output circuit.

One object of the present invention is the provision of an improved DC power supply of the type including a switching device and a choke inductor, including an output voltage sensing circuit responsive to the load current for controlling the switching device. A feedback circuit is responsive to the sensed load voltage for controlling the period of the switching device.

Another object of this invention is the provision of a DC power supply including an overload protection circuit for disabling the switching device when an overload condition is sensed.

Other objects and features of the invention will be apparent from the following description, and from the drawings. While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated.

BRIEF DESCRIPTION OF THE DRAWINGS

FIG. 4 is a schematic diagram illustrating in detail the DC power supply of FIG. 1.

DESCRIPTION OF THE PREFERRED EMBODIMENT

Figure 1:
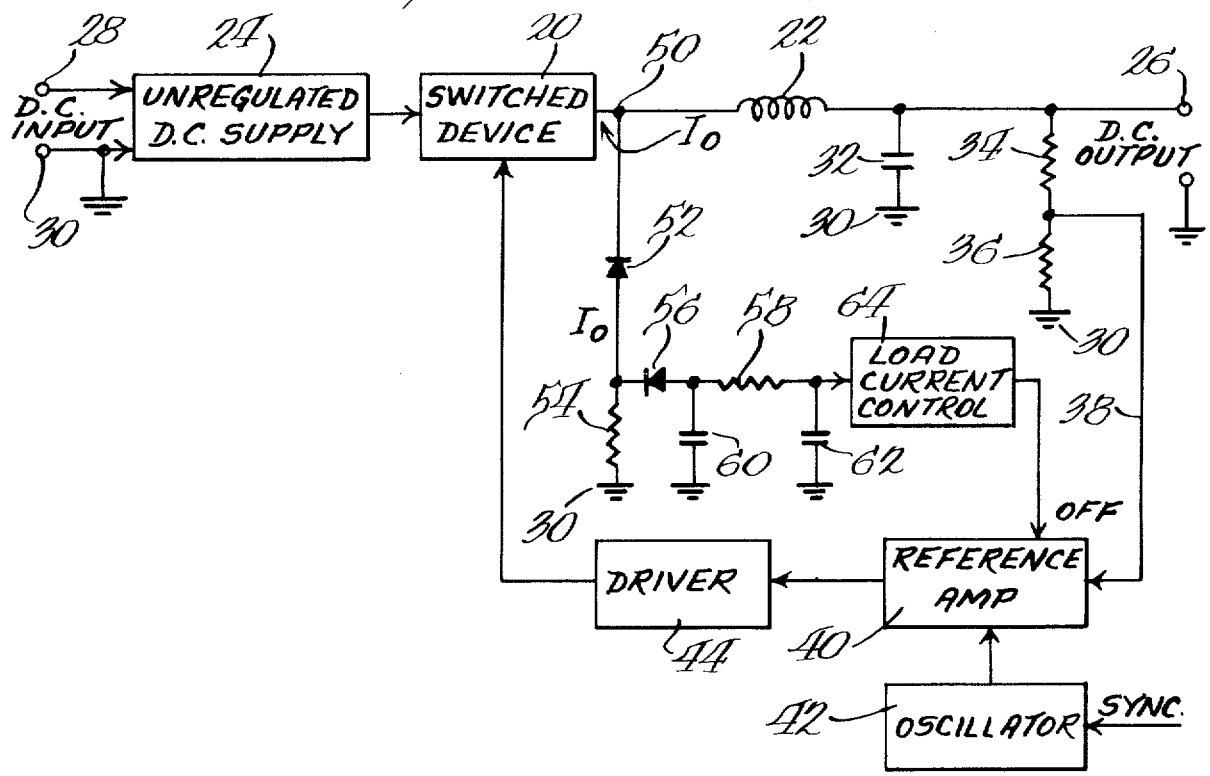
FIG. 1 is a partly block and partly schematic diagram of the novel DC power supply with overload current protection.

Turning to FIG. 1, a DC power supply includes a three terminal semiconductor switching device 20 and a reactive impedance such as a choke inductor 22 connected in series between an unregulated DC supply 24 and an output terminal 26. The unregulated DC supply 24 receives power from an unregulated DC input voltage across an input terminal 28 and a ground terminal 30 which connects with a source of reference potential or ground. A smoothing capacitor 32 is connected to ground 30 at the output side of the choke inductor 22.

To provide DC regulation, a feedback circuit includes a pair of voltage divider resistors 34 and 36 connected between the output terminal 26 and ground 30. A voltage feedback line 38, connected to the junction between resistors 34 and 36 produces a DC feedback voltage having a magnitude corresponding to the magnitude of the output voltage at terminal 26. Feedback line 38 is coupled to a reference amplifier 40 which has another input from a synchronized sawtooth oscillator 42. As a sawtooth waveform from oscillator 42 exceeds the DC reference level on feedback line 38, the reference amplifier 40 produces a squarewave output which is amplified by a driver 44 and controls the switching period of the switching device 20. For example, if the output voltage increases, the reference amplifier reduces the switching period in order to maintain the output voltage constant.

An overload protection circuit is coupled to a junction 50 between the switching device 20 and the choke inductor 22. The junction 50 is coupled through a diode rectifier 52 sometimes referred to as a commutating diode and a resistor 54 of very low resistance to ground 30. As the switching device 20 is driven off, the load current through inductor 22 cannot go to zero instantaneously and a potential is developed across the inductor which forward biases rectifier 52. The load current which was flowing through the switching device 20 and the inductor 22 is coupled through diode 52 and resistor 54 to ground, producing across resistor 54 a voltage waveform which is proportional to the output current. The resistor 54 is coupled through a diode 56 to a filter network or integrator including a series resistor 58 and a pair of capacitors 60 and 62 shunted to ground 30. The filter network is coupled to a load current control 64 which disables the reference amplifier 40 when the output load current, as indicated by the level of the voltage waveform across capacitor 62 exceeds a predetermined value. One advantage of this arrangement is that a common ground between the input and output terminals of the regulator can be used, whereas with the conventional method of a resistor in series with the load for sensing an overload, this was not possible.

Figure 2:
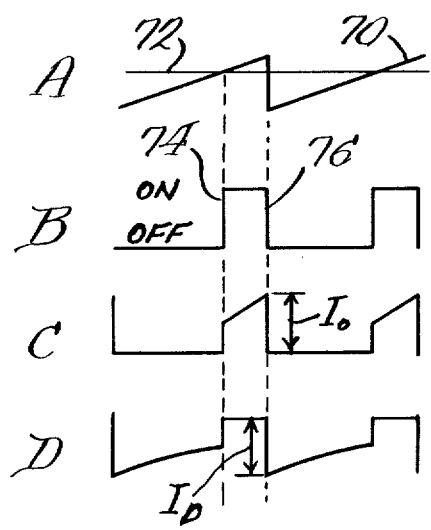
FIGS. 2A–2D are waveforms taken at various points in the circuit of FIG. 1.
Figure 3:
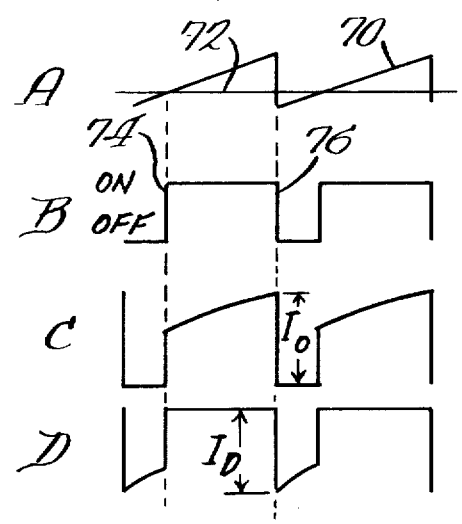
FIGS. 3A–3D are waveforms taken at the same points as the waveforms in FIGS. 2A–2D, for a different load current output.

The operation of the DC power supply of FIG. 1 may be better understood with reference to FIGS. 2 and 3 which show waveforms occurring at various points in the FIG. 1 circuit. FIGS. 2A–2D show waveforms occurring during normal regulation, and FIGS. 3A–3D show waveforms occurring at the same circuit points but during an overload condition. The oscillator 42 produces a reference sawtooth voltage 70, illustrated in FIGS. 2A and 3A. The DC feedback signal on line 38 produces a DC reference level 72 which varies depending on the output voltage at terminal 26.

The reference amplifier 40 generates an output squarewave pulse, shown in FIGS. 2B and 3B, which is initiated at time interval 74 when the sawtooth voltage 70 just exceeds the level of the feedback voltage 72. The squarewave pulse from reference amplifier 40 terminates at time interval 76, when the sawtooth voltage 70 is negative going at the end of each cycle. Thus, the width of the squarewave pulse produced by reference amplifier 40 depends on the magnitude of the feedback voltage 72. The squarewave pulse, after being amplified by driver 44, turns on the switching device 20 and passes current to the series choke inductor 22, resulting in the output current pulse shown in FIGS. 2C and 3C. The output current begins at an intermediate level, and increases along a ramp to a peak level $I_o$ at time interval 76.

As the switching device 20 is driven off, an inductive voltage kick is produced across the choke inductor 22 as the output current collapses. The negative going inductive voltage kick forward biases diode 52 and causes the load current which had been flowing through the switching device 20 to flow through diode 52 and resistor 54 to ground 30. This current has a peak value $I_D$, as shown in FIGS. 2D and 3D and is equal to the output current $I_o$ which had been flowing through the choke inductor 22. Whe the integrated diode current exceeds a predetermined value, the load current control 64 disables the reference amplifier 40. The sensed signal can be used to either limit the load current to a predetermined level or to turn off the regulator when a predetermined load current level is exceeded.

In FIG. 4, the DC power supply of FIG. 1 is illustrated in detail. Reference amplifier 40 includes a comparator transistor 90 having its base coupled to the DC feedback line 38, its emitter coupled through a resistor 92 to the wiper of a voltage set potentiometer 94, and its collector coupled to the base of transistor 102. Potentiometer 94 can be adjusted to raise or lower the voltage bias of the emitter of transistor 90, thereby affecting the voltage level 72 and the width of the pulse 76. The sawtooth oscillator 42 is coupled to the base of transistor 102 by means of capacitor 98 and resistor 96 and forward biases the transistor 102 which forms with transistor 110 a pulse generator to generate the squarewave pulses shown in FIGS. 2B and 3B. The collector of transistor 102 is coupled through a resistor 104 to a stabilized low voltage power supply line 106 which is bypassed to ground through a large capacitor 108. The collector of transistor 102 is also coupled through an RC network to the base of transistor 110.

The squarewave pulse from transistor 110 is coupled through a pair of voltage dividing resistors 112 and 114 and forward biases a driving transistor 44. The collector output pulse from 44 is coupled over a line 116 to the primary 118 of a gating transformer having a secondary 119 coupled between the base or control terminal and the emitter of the three terminal switching transistor 20. As transistor 44 is driven into a conductive state, the pulse transformer drives the switching transistor 20 hard into conduction allowing the output seen in FIGS. 2C and 3C to pass through its pair of output terminals to inductor 22. A change in output voltage at terminal 26 appears as a change in voltage across resistor 36. This change is coupled through the feedback line 38 to the base of the comparator transistor 90. The comparator transistor 90 then alters the base-emitter potential of transistor 102. The squarewave initiated by transistor 102 must then begin at a different portion of the sawtooth wave form developed by the sawtooth generator 42, i.e., the length of the squarewave initiated by transistor 102 is altered in a manner such that the altered conduction time of transistor 20 will restore the desired output voltage at terminal 26.

Oscillator 42 consists of three transistors 122, 123 and 124 connected to form a sawtooth generator. The free running period of the sawtooth generator 42 is selected to be slightly greater than the horizontal synchronizing period of the horizontal oscillator in a television receiver. The oscillator 42 is synchronized to the horizontal sync pulses on an output sync line 126 through an RC network coupled to the base of transistor 124 and the collector of transistor 123. The oscillator is synchronized to the horizontal oscillator to minimize interference with the video reproduction as the switching transistor is switched during the blanking period of the television signal. As a result, the period of the sawtooth waveform 70 in FIGS. 2A and 3A is equal to the horizontal deflection rate of the television receiver. The sawtooth waveform is coupled through capacitor 98 to the squarewave generator 102 in the reference amplifier 40.

The overload protection circuit includes a pair of diodes 52 which pass current from the choke inductor 22 to ground through the resistor 54 when current through the switching transistor 20 is interrupted. This produces a voltage across resistor 54 which is proportional to the load current. A single diode may be used in place of the two diodes 52. The voltage creates a current which flows through a resistor 130 and the rectifier diode 56 to the integrator filter network consisting of capacitor 60 and 62 and resistor 58. The diode current through the diode 56, shown in FIGS. 2D and 3D, has a peak value equal to the peak current through the choke inductor 22. When the voltage across capacitor 62 exceeds a predetermined level, thereby indicating excessive output current is being drawn, a pair of transistors 140 and 142, connected in a regenerative circuit, are forward biased to create a low impedance to ground at line 144. A capacitor 145 is coupled across the emitter and base electrodes of transistor 140. The regenerative switching circuit formed by transistors 140 and 142 divert the current otherwise coupled to the base of transistor 102 (from the sawtooth generator 42), thereby disabling the pulse generator in the reference amplifier 40. The output voltage at terminal 26 becomes zero and no current flows through the load. The pair of regenerative transistors 140 and 142 become unlatched when the input power at terminal 28 is momentarily interrupted. Normal operation is then restored if the excessive load current demand has been removed.

Current through the commutating diodes 52 is shown as the waveform D in FIGS. 2 and 3. The peak current $I_D$ is proportional to the DC current through the load. Current through the diodes at reference time 74 is also proportional to load current but is influenced by pulse width and is therefore not useful. The diode 56 is employed to select only the waveform shown as $I_D$.

The foregoing disclosure of specific embodiments is illustrative of the broad inventive concepts comprehended by the invention.

Having described the invention, the embodiments of the invention in which an exclusive property or privilege is claimed are defined as follows:

1. In a DC power supply having an input terminal for unregulated DC input voltage and an output terminal for regulated DC output voltage the improvement comprising:
   a switching device for interrupting the DC input current to produce current pulses;
   reactive impedance means for smoothing the current pulses produced by the switching device to produce the DC output voltage;
   rectifier means connected to the reactive impedance means for maintaining current flow through the impedance when the switching device is non-conductive;
   current sensing means connected to the rectifier means for developing a control signal proportional to the current pulses through the rectifiers;
   control circuit means for varying the switching period of the switching device to regulate said output voltage comprising;
   first and second transistors having the collector of the first transistor coupled to the base of the second transistor and having their emitters connected together,
   a source of reference potential connected to said emitters,
   oscillator means connected to the base of the second transistor,
   voltage sensing means connected to said output terminal for developing a signal indicative of the power supply output voltage, said voltage sensing means being connected to the base of the first transistor, said control circuit operable to generate a signal for controlling the conduction period of the switching device, and
   overload protection means comprising semiconductor switch means connected to said current sensing means and to the base of the second transistor and operable to disable said control circuit and shutdown said power supply when said control signal exceeds a predetermined level.

2. The improvement of claim 1 wherein the reactive impedance comprises an inductor coupled in series between the switching device and the output terminal.

3. The DC power supply of claim 1 wherein the source of reference potential comprises a potentiometer having one terminal connected to ground and having its adjustable contact connected to the emitter of the first transistor.

4. The DC power supply of claim 1 wherein a resistor is connected between the emitter of the first transistor and the emitter of the second transistor and wherein a resistor is connected between the emitter of the first transistor and the source of reference potential.

5. The DC power supply of claim 1 wherein the switch means comprises two transistors connected in a regenerative circuit which latches in the On condition when said control signal exceeds a predetermined level.

6. In a DC power supply having an input terminal for unregulated DC input voltage and an output terminal for regulated DC output voltage the improvement comprising:
   a switching device for interrupting the DC input current to produce current pulses,
   reactive impedance means for smoothing the current pulses produced by the switching device to produce the output voltage,
   rectifier means connected to the reactive impedance means for maintaining current flow through the impedance when the switching device is non-conductive,
   current sensing means connected to the rectifier means for developing a control signal proportional to the current pulses through the rectifiers,
   control circuit means for varying the switching period of the switching device to regulate the power supply output voltage comprising first and second transistors and a source of DC reference potential wherein the collector of the first transistor is coupled to the base of the second transistor and the emitter of the first transistor is coupled to the source of reference potential and to the emitter of the second transistor, the base of the first transistor being connected to the power supply output terminal to receive a signal which is indicative of the power supply output voltage, and the base of the second transistor being connected to a source of control signals which vary in periodic fashion, said first and second transistors operating to generate a control signal for the switching device, and
   overload protection means comprising semiconductor switching means connected to the current sensing means and to the base of the second transistor and actuated when said control signal exceeds a predetermined level to connect the control means input signal to ground to disable said control circuit and shutdown said power supply.

* * * * *